(12) United States Patent
Carlson et al.

(10) Patent No.: US 12,291,599 B2
(45) Date of Patent: *May 6, 2025

(54) SEMI-CRYSTALLINE POLYESTER POLYOL AND METHOD OF MAKING THE SAME

(71) Applicant: H.B. Fuller Company, St. Paul, MN (US)

(72) Inventors: Brian W. Carlson, Woodbury, MN (US); Justin Kaffenberger, Circle Pines, MN (US); Alan R. Nahkala, Stillwater, MN (US)

(73) Assignee: H.B. Fuller Company, St. Paul, MN (US)

( * ) Notice: Subject to any disclaimer, the term of this patent is extended or adjusted under 35 U.S.C. 154(b) by 380 days.

This patent is subject to a terminal disclaimer.

(21) Appl. No.: 17/662,211

(22) Filed: May 5, 2022

(65) Prior Publication Data

US 2022/0356300 A1    Nov. 10, 2022

Related U.S. Application Data

(60) Provisional application No. 63/201,575, filed on May 5, 2021.

(51) Int. Cl.
| | |
|---|---|
| *C08G 63/52* | (2006.01) |
| *C08G 18/36* | (2006.01) |
| *C08G 18/76* | (2006.01) |
| *C08G 63/12* | (2006.01) |
| *C08G 63/20* | (2006.01) |
| *C08L 75/14* | (2006.01) |
| *C09J 7/38* | (2018.01) |
| *C09J 175/14* | (2006.01) |

(52) U.S. Cl.
CPC ............ *C08G 63/52* (2013.01); *C08G 18/36* (2013.01); *C08G 18/7692* (2013.01); *C08G 63/12* (2013.01); *C08G 63/20* (2013.01); *C08L 75/14* (2013.01); *C09J 7/38* (2018.01); *C09J 175/14* (2013.01); *C09J 2475/00* (2013.01)

(58) Field of Classification Search
CPC ......... C08G 63/20; C08G 63/52; C08G 63/12
See application file for complete search history.

(56) References Cited

U.S. PATENT DOCUMENTS

| | | | |
|---|---|---|---|
| 3,714,090 A * | 1/1973 | Lasher | C09D 167/08 525/517.5 |
| 3,963,699 A | 6/1976 | Rizzi et al. | |
| 4,469,635 A | 9/1984 | Peterson | |
| 4,624,869 A | 11/1986 | De Graaf | |
| 4,740,567 A | 4/1988 | Schmidt | |
| 4,798,859 A | 6/1989 | Hohlein et al. | |
| 5,349,041 A * | 9/1994 | Blum | C09K 3/1021 528/80 |
| 5,387,642 A * | 2/1995 | Blum | C08G 18/12 524/591 |
| 5,480,667 A | 1/1996 | Corrigan et al. | |
| 5,490,995 A | 2/1996 | Corrigan | |
| 5,527,866 A | 6/1996 | Corrigan et al. | |
| 5,538,670 A | 7/1996 | Sharma | |
| 5,624,676 A | 4/1997 | Mackey et al. | |
| 5,958,594 A | 9/1999 | Hisanaga et al. | |
| 5,959,067 A | 9/1999 | Bakker et al. | |
| 7,098,291 B2 | 8/2006 | Brinkman | |
| 7,374,779 B2 | 5/2008 | Chen et al. | |
| 8,070,833 B2 | 12/2011 | Murphy | |
| 8,157,873 B2 | 4/2012 | Murphy et al. | |
| 8,333,905 B1 | 12/2012 | Kurth et al. | |
| 9,334,347 B2 | 5/2016 | DiBiase et al. | |
| 2006/0182957 A1 | 8/2006 | Simmons | |
| 2013/0131222 A1 | 5/2013 | Gross | |
| 2014/0275310 A1 | 9/2014 | Adkins et al. | |
| 2017/0002134 A1 * | 1/2017 | Smits | C08G 63/672 |
| 2017/0008997 A1 * | 1/2017 | Honcoop | C08G 18/7671 |
| 2017/0190829 A1 | 7/2017 | Tian | |
| 2018/0305597 A1 | 10/2018 | Yao | |
| 2020/0055982 A1 | 2/2020 | Wu et al. | |
| 2020/0148817 A1 | 5/2020 | Terwillegar et al. | |

FOREIGN PATENT DOCUMENTS

| | | |
|---|---|---|
| CA | 888282 | 12/1971 |
| CN | 103772675 | 5/2014 |
| EP | 4261240 | 4/2022 |
| GB | 2278350 | 11/1994 |
| KR | 20110073975 | 6/2011 |
| WO | WO 2018-005538 | 1/2018 |
| WO | WO 2003-029182 | 4/2020 |

* cited by examiner

Primary Examiner — Michael L Leonard

(74) Attorney, Agent, or Firm — Kirsten Stone; Allison Johnson

(57) ABSTRACT

Disclosed is a semi-crystalline polyester polyol having an acid number less than 4 and derived from a saturated fatty component having a hydroxyl number less than 2, the saturated fatty component being selected from the group consisting of saturated fatty acid, saturated fatty acid ester, saturated oil, and combinations thereof, polyhydric alcohol that includes at least three hydroxyl groups, and a dibasic acid.

23 Claims, No Drawings

SEMI-CRYSTALLINE POLYESTER POLYOL AND METHOD OF MAKING THE SAME

CROSS REFERENCE TO RELATED APPLICATIONS

This application claims the benefit of U.S. Provisional Application No. 63/201,575, filed May 5, 2021, and incorporated herein.

BACKGROUND

The invention is directed to preparing semi-crystalline polyester polyols.

Polyester polyols are often made from aliphatic polyols and dicarboxylic acids. Polyester polyols can be amorphous or semi-crystalline. Polyester polyols are often used to form urethane polymers and prepolymers. Semi-crystalline polyester polyols can impact various properties of polymers and prepolymers made therewith including, e.g., the rate of crystallization of the prepolymer, the temperature at which the prepolymer flows, and the temperature at which an adhesive formulated therewith solidifies and loses tack.

Natural oils have been used to make amorphous polyester polyols that are liquid at room temperature. Most natural oils include unsaturation and, in some cases (e.g., castor oil), include hydroxyl groups. Natural oils are triglycerides with fatty acid side chains that often have from 8 to 22 carbon atoms. Polyester polyols have been made from unsaturated natural oils by first adding hydroxyl functionality through a number of processes including, e.g., epoxidation and ring opening, hydroxylation, transesterification, and oxidation. In some cases, after the oils have been hydroxylated, the resulting product has then been further reacted with polyols, diacids and combinations thereof to form polyester polyols.

Many natural oils contain unsaturation in the fatty acid chains. The degree of unsaturation can be reflected in the Iodine Value of an oil. Oils can be hydrogenated to remove unsaturation in the fatty acid chains of the oil. Soybean oil, for example, typically has an Iodine Value from 125 to 135, whereas hydrogenated soybean oil can have an Iodine Value of less than 5.

There is a need for forming semi-crystalline polyester polyols from biobased starting materials. There is also a need for novel semi-crystalline polyester polyols having hydroxyl numbers, degrees of crystallinity, and levels of functionality that are suitable for forming polymers and prepolymers therefrom including, e.g., polyurethane prepolymers.

SUMMARY

In one aspect, the invention features a semi-crystalline polyester polyol that has an acid number of less than 4 and includes the reaction product of a saturated fatty component that has a hydroxyl number less than two (or even less than one), the saturated fatty component being selected from the group consisting of saturated fatty acid, saturated fatty acid ester, saturated oil, and combinations thereof, a polyhydric alcohol that has at least three hydroxyl groups, and a dibasic acid. In some embodiments, the semi-crystalline polyester polyol exhibits a heat of fusion of at least 25 Joules per gram (J/g) and is solid at room temperature. In other embodiments, the semi-crystalline polyester polyol exhibits a heat of fusion of at least 50 J/g.

In one embodiment, the semi-crystalline polyester polyol has an average hydroxyl functionality of from to 1.5 to 2.5.

In some embodiments, the semi-crystalline polyester polyol exhibits a peak melt temperature of at least 30° C.

In some embodiments, the semi-crystalline polyester polyol exhibits a peak crystallization temperature of greater than 25° C. In other embodiments, the semi-crystalline polyester polyol exhibits a peak crystallization temperature of at least 35° C.

In one embodiment, the semi-crystalline polyester polyol has a hydroxyl number of from 10 to 110. In another embodiment, the semi-crystalline polyester polyol has a hydroxyl number of from 20 to 45.

In another embodiment, the semi-crystalline polyester polyol has an acid number of no greater than 2. In other embodiments, the semi-crystalline polyester polyol has an acid number no greater than 1.

In one embodiment, the dibasic acid is selected from the group consisting of succinic acid, adipic acid, suberic acid, sebacic acid, dodecanedioic acid, terephthalic acid, phthalic acid, phthalic anhydride, and combinations thereof.

In another embodiment, the polyhydric alcohol is a tetraol.

In another embodiment, the fatty component has an Iodine Value no greater than 50.

In other embodiments, the semi-crystalline polyester polyol is further derived from monomeric diol such that the semi-crystalline polyester polyol includes the reaction product of a) the saturated fatty component having a hydroxyl number less than 2, the polyhydric alcohol comprising at least three hydroxyl groups, b) the dibasic acid, and c) the monomeric diol.

In another aspect, the invention features a semi-crystalline polyester polyol that includes a second reaction product of a dibasic acid and a first reaction product derived from a saturated fatty component that has a hydroxyl number less than two (or even less than one), the saturated fatty component being selected from the group consisting of saturated fatty acid, saturated fatty acid ester, saturated oil, and combinations thereof, and polyhydric alcohol that includes at least three hydroxyl groups, the semi-crystalline polyester polyol having an acid number of less than 4. In one embodiment, the saturated fatty component is a saturated fatty acid ester, a saturated oil, or a combination thereof, and the first reaction product is a transesterification product resulting from the transesterification of the saturated fatty component with the polyhydric alcohol. In another embodiment, the semi-crystalline polyester polyol has a hydroxyl number of from 10 to 110. In other embodiments, the semi-crystalline polyester polyol has a hydroxyl number of from 20 to 45.

In other aspects, the invention features a method of making a semi-crystalline polyester polyol, the method including reacting a saturated fatty component that has a hydroxyl number less than two (or even less than one), the saturated fatty component being selected from the group consisting of saturated fatty acid, saturated fatty acid ester, saturated oil, and combinations thereof, and a polyhydric alcohol that includes at least three hydroxyl groups to form a first reaction product, and reacting the first reaction product with a dibasic acid to form a semi-crystalline polyester polyol having an acid number of less than 4. In one embodiment, the saturated fatty component includes an ester and the method includes transesterifying the ester with the polyhydric alcohol. In other embodiments, the method includes esterifying the first reaction product with the dibasic acid. In some embodiments, the dibasic acid is selected from the group consisting of succinic acid, adipic acid, suberic acid, sebacic acid, dodecanedioic acid, terephthalic acid, phthalic acid, phthalic anhydride, and combinations thereof. In some embodiments, the semi-crystalline polyester polyol exhibits a heat of fusion of at least 25 Joules per gram. In another embodiment, the semi-crystalline polyester polyol exhibits a peak melt temperature of at least 30° C. In another embodiment, the semi-crystalline polyester polyol exhibits a peak crystallization temperature of greater than 25° C. In another embodiment, the semi-crystalline polyester polyol exhibits a peak crystallization temperature of at least 30° C. In some embodiments, the semi-crystalline polyester polyol has a hydroxyl number of from 10 to 110. In other embodiments, the semi-crystalline polyester polyol has a hydroxyl number of from 20 to 45. In another embodiment, the saturated fatty component has an Iodine Value of no greater than 50.

The invention features a semi-crystalline polyester polyol that is solid at room temperature, exhibits a peak melt temperature greater than 25° C., exhibits a peak crystallization temperature greater than 25° C., and recrystallizes upon cooling from a molten state.

Other features and advantages will be apparent from the following description of the preferred embodiments and from the claims.

Glossary

In reference to the invention, these terms have the meanings set forth below:

The term "semi-crystalline" means having at least some crystallinity at a temperature greater than room temperature as indicated by the presence of a heat of fusion.

The term "dibasic acid" means dicarboxylic acid, dicarboxylic acid anhydride, dicarboxylic acid ester, and any combinations of thereof.

The term "saturated" means having an Iodine Value no greater than 50.

The term "saturation" means having an Iodine Value no greater than 50.

The term "fatty" means having a carbon chain that includes at least eight carbon atoms.

The term "solid" in reference to the semi-crystalline polyester polyol means solid at room temperature, exhibiting a heat of fusion, a peak melt temperature greater than 25° C., a heat of crystallization, and a peak crystallization temperature greater than 25° C., and crystallizing upon cooling from a molten state.

The term "reaction product of" does not exclude additional unrecited reactants.

The term "derived from" does not exclude additional unrecited reactants.

DETAILED DESCRIPTION

The semi-crystalline polyester polyol includes the reaction product of a saturated fatty component, a polyhydric alcohol, and a dibasic acid. The semi-crystalline polyester polyol is solid at room temperature, preferably exhibits a heat of fusion of at least 25 Joules per gram (J/g), at least 50 J/g, or even at least 75 J/g, and preferably exhibits heat of crystallization of at least 25 J/g, at least 50 J/g, or even at least 75 J/g.

The semi-crystalline polyester polyol exhibits a peak melt temperature of at least 30° C., at least 35° C., or even at least 40° C., and a peak crystallization temperature of greater than 25° C., at least 30° C., or even at least 35° C.

The semi-crystalline polyester polyol has a hydroxyl number of from 10 to 150, from 10 to 110, or even from 20 to 45.

The semi-crystalline polyester polyol has an acid number of less than 4, no greater than 3, no greater than 2, or even no greater than 1.

The semi-crystalline polyester polyol preferably has an average hydroxyl functionality of from 1.5 to 2.5, from 1.75 to 2.25, or even 2.0, as calculated based on the starting materials (i.e., the amounts and the composition of the reactants).

Saturated Fatty Component

The saturated fatty component has a hydroxyl number (i.e., OH number) less than 2, less than 1, or even is free of hydroxyl groups such that it has no measurable hydroxyl number. To the extent that the saturated fatty component has a measurable hydroxyl number, the hydroxyl groups which form the basis for the hydroxyl number result from impurities from the glyceride from which the fatty component was derived (where applicable), e.g., impurities in the form of free glycerol or mono- or di-glycerides. The saturated fatty component preferably has an Iodine Value of no greater than 50, no greater than 40, no greater than 30, no greater than 20, or even no greater than 5. The saturated fatty component is solid at room temperature and preferably has a peak melting temperature of greater than 30° C., at least 35° C., or even at least 40° C. The saturated fatty component can be naturally occurring or can be the result of a variety of processes including, e.g., a hydrogenation process to remove unsaturation.

Useful saturated fatty components include, e.g., saturated oils, saturated fatty acids, saturated fatty acid esters, and combinations thereof. Useful saturated oils include, e.g., saturated mono-, di- and tri-glycerides, natural oils having an Iodine Value no greater than 50, hydrogenated oils (e.g., hydrogenated oils having an Iodine Value less than 50), and combinations thereof. Useful oils that have an Iodine Value less than 50 or that can be hydrogenated to an Iodine Value less than 50 include, e.g., soybean oil, cottonseed oil, palm oil, palm kernel oil, coconut oil, rape seed oil, corn oil, olive oil, safflower oil, sesame oil, nut oil (e.g., peanut, almond, and walnut oils, and combinations thereof), avocado oil, tall oils, tallow, lesquerella oil, tung oil, whale oil, tea seed oil, fish oils, and combinations thereof, and processed natural oils (e.g., palm stearin, palm double stearin, palm kernel stearin, and combinations thereof), and combinations thereof.

Suitable hydrogenated oils are commercially available under a variety of trade designations including, e.g., NATUREWAX S-155 hydrogenated soybean oil having a mettler drop point of 158° F. (70° C.) and a maximum Iodine Value of 4 from Cargill Inc. (Charlotte, North Carolina), the value as reported by the manufacturer, and under the MARCUS series of trade designations from Marcus Oil and Chemical (Houston, Texas) including, e.g., MARCUS NAT WAX 155 hydrogenated soybean oil having a maximum Iodine Value of less than 5, a maximum acid value of 1, and a melt point of from 68° C. to 71° C. (i.e., 155° F. to 160° F.) and MARCUS NAT WAX 180 hydrogenated soybean oil having a maximum Iodine Value of 4, a maximum acid value of 3, and a melt point of from 82° C. to 84° C. (i.e., 180° F. to 184° F.), all values as reported by the manufacturer.

Useful saturated fatty acids and saturated fatty acid esters have at least one carbon chain that includes at least eight carbon atoms, at least 12 carbon atoms, from 12 carbon atoms to 22 carbon atoms, or even from 14 carbon atoms to 18 carbon atoms, and combinations thereof. Useful saturated fatty acids include, e.g., caprylic acid, capric acid, lauric acid, myristic acid, palmitic acid, stearic acid, arachidic acid, behenic acid, and combinations thereof. Useful saturated fatty acid esters include the saturated fatty acid esters of the aforementioned fatty acids including, e.g., stearate, caprylate, caprate, laurate, myristate, palmitate, arachidate, behenate, and combinations thereof.

Polyhydric Alcohol

The polyhydric alcohol includes at least three hydroxyl groups. Useful polyhydric alcohols include at least three hydroxyl groups, at least four hydroxyl groups, or even greater than four hydroxyl groups, and have from three to 20 carbon atoms. The polyhydric alcohol preferably has a molecular weight of less than 500 g/mole, or even less than 400 g/mole. Suitable polyhydric alcohols include, e.g., triols (e.g., trimethylolpropane, trimethylolethane, glycerol, 1,2,4-butane triol, 1,2,6-hexane triol, and cyclohexanetriol (e.g., 1,3,5-cyclohexanetriol)), tetraols (e.g., erythritol, pentaerythritol, bis(trimethylolpropane), and diglycerol), higher order polyhydric alcohols (e.g., dipentaerythritol, tripentaerythritol, sorbitol, and mannitol), and combinations thereof.

Dibasic Acid

The dibasic acid can be a dibasic acid, dibasic acid anhydride, dibasic acid ester or a combination thereof, useful examples of which include, e.g., dicarboxylic acids, dicarboxylic acid anhydrides, diesters of dicarboxylic acids, and combinations thereof. Useful dibasic acids include, e.g., linear, branched, cyclic aliphatic, and aromatic dibasic acids, and combinations thereof. Suitable linear dibasic acids preferably include an even number of carbon atoms in the carbon chain and preferably from 2 to 12 carbon atoms. Useful dibasic acids include, e.g., succinic acid, adipic acid, suberic acid, sebacic acid, terephthalic acid, phthalic acid, phthalic anhydride, and combinations thereof.

Reaction Process

The semi-crystalline polyester polyol can be prepared according to a variety of processes including, e.g., a first reaction (e.g., a transesterification reaction, an esterification reaction, or a combination thereof) in which the polyhydric alcohol is reacted with the saturated fatty ester component to form a first reaction product, and a second reaction (e.g., an esterification reaction, a transesterification reaction, a polycondensation reaction, or a combination thereof) in which a dibasic acid is reacted with the first reaction product to form the semi-crystalline polyester polyol. The second reaction can start simultaneously with the first reaction, can start before the first reaction starts, can occur after the first reaction is complete, or while the first reaction is proceeding, and combinations thereof.

Catalysts

The reactions can be conducted in the presence of a catalyst. Suitable transesterification and esterification catalysts include, e.g., catalysts that include tin, titanium, zirconium, hafnium, zinc, manganese, magnesium, calcium, strontium, and combinations thereof, alkali metal salts, and combinations thereof. Particularly useful catalysts for transesterification include alkali metal salt catalysts including, e.g., lithium hydroxide, potassium hydroxide, sodium methoxide, and combinations thereof. Particularly useful catalysts for esterification include, e.g., the alkali metal salt catalysts set forth above, tin catalysts (e.g., dibutyltin oxide, butylstannoic acid, monobutyltin tris(2-ethylhexanoate), dibutyltin acetate, monobutyltin dihydroxychloride and combinations thereof), titanate catalysts (e.g., tetra-n-butyl titanate, tetra-2-ethylhexyl titanate, tetraisopropyl titanate, and combinations thereof), zirconium catalysts (e.g., zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, zirconium tetra-t-butoxide, and combinations thereof), and combinations thereof.

The first and second reactions preferably proceed in an inert environment, e.g., under an inert gas such as nitrogen. The temperature of the reaction mixture during the first and second reactions can be adjusted as needed according to a variety of factors including, e.g., the reactants, the catalysts, the equipment, the properties of the polyester polyol to be produced, the reactions, and combinations thereof. Useful reaction temperatures for the first and second reactions include, e.g., from 150° C. to 270° C., or even from 180° C. to 240° C.

The semi-crystalline polyester polyol optionally is derived from a variety of additional components including, e.g., cyclic esters (e.g., caprolactone), cyclic carbonates (e.g., ethylene carbonate, propylene carbonate, and combinations thereof), monomeric diols, trifunctional acids, and combinations thereof. Useful monomeric diols include, e.g., ethylene glycol, diethylene glycol, propylene glycol, dipropylene glycol, 1,4-butane diol, 1,5-pentane diol, neopentyl glycol, 1,6-hexane diol, 1,8-octane diol, 1,10-decane diol, 1,12-dodecane diol, 2-ethyl hexane diol, and combinations thereof.

Useful trifunctional acids include, e.g., citric acid, isocitric acid, aconitic acid, propane-1,2,3-tricarboxylic acid, agaric acid, trimesic acid, and combinations thereof.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Hydroxyl Number Test Method

Hydroxyl number is determined according to ASTM E-222-17 entitled, "Standard Test Methods for Hydroxyl Groups Using Acetic Anhydride Acetylation," with the exception that the acetylation reaction time is four hours.

Acid Number Test Method

Approximately 3 grams of sample is dissolved in a mixture of 50 mL of toluene and 50 mL isopropyl alcohol. Once the sample is dissolved, approximately 1 mL of a 1% solution of phenolphthalein in isopropyl alcohol is added to the solution and the solution is then titrated with a 0.1 N solution of potassium hydroxide in isopropyl alcohol. A blank is also titrated. The Acid Number of a sample is calculated according to the following formula:

$$\text{Acid Number} = [A \times N \times 56.1]/W,$$

where A is the volume in milliliters of the potassium hydroxide solution,

N is the normality of the potassium hydroxide solution, and

W is the sample weight in grams.

Differential Scanning calorimetry (DSC) Test Method for Peak Melt Temperature (Tm), Heat of Fusion, Peak Crystallization Temperature, and Heat of Crystallization Peak crystallization temperature, peak melting temperature, heat of fusion and heat of crystallization are determined as follows: a 3 mg to 6 mg sample is placed into a pan specific to the machine being used (e.g., TA Q2000 DSC V24.11 with standard aluminum pans and lids). The sample is then covered with a specified lid and closed. A pan and lid containing no material are also closed and used as a reference sample. The sample is then loaded into the differential calorimeter and covered with a nitrogen blanket. The sample is equilibrated at 25° C., held at 25° C. for one minute, then heated at a rate of 10° C. per minute until the sample reaches 100° C. The sample is then put into an isothermal state for 1 minute at 100° C. The sample is then cooled at a rate of 10° C. per minute until the sample reaches a temperature of −25° C. Then the sample is again put into an isothermal state for 5 minutes at −25° C. The sample is then heated at 10° C. per minute until the sample reaches 100° C. The resulting data is represented in graphical exothermal down format containing Heat Flow versus Temperature. The Tm (melt temperature) is taken as the peak of the greatest magnitude during the second melt and is reported in degrees Celsius. The heat of fusion (Hfus) is taken during the second melt and is reported in units of Joules per gram (J/g). The peak crystallization temperature is taken during the cool down period and is reported in degrees Celsius. The heat of crystallization is taken during the cool down period and is reported in units of J/g.

Iodine Value Test Method

Iodine Value is determined according to AOCS Recommended Practice Cd 1c-85 (2017).

Example 1

NATUREWAX S-155 hydrogenated soybean oil, in an amount of 848.2 g, having an Iodine Value of 0.5 (Cargill Inc., Charlotte, N.C.) was melted in a glass reactor by heating to 105° C. Pentaerythritol, in an amount of 117.9 g, and 96 mg of lithium hydroxide monohydrate were then added to the reactor with stirring. The mixture was heated to 225° C. and under a nitrogen atmosphere. The mixture was held at 225° C. for 5.5 hours and then cooled to 85° C., at which point the stirring was discontinued. The mixture was allowed to solidify and cool to room temperature overnight. The mixture was then heated to 100° C., at which point stirring was started. Adipic acid, in an amount of 201.1 g, and 86 mg, tetraisopropyltitanate were then added to the mixture. The mixture was heated in stages under a nitrogen atmosphere to 240° C., held at 240° C. for 7 hours, cooled to 120° C., and then discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 34.1, an acid number of 0.58, a heat of fusion of 89.2 J/g, a peak melting temperature of 42.9° C., a peak crystallization temperature of 38.8° C., and a heat of crystallization of 90.7 J/g.

Example 2

NATUREWAX S-155 hydrogenated soybean oil (606.3 g (0.686 mol)) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 179 mg of lithium hydroxide monohydrate catalyst was added thereto with stirring. The mixture was held at 215° C. for 5 hours while stirring continued.

Then 123.81 g (0.836 mol) of phthalic anhydride were added to the reactor along with 16.4 g of o-xylene as an azeotrope. Mixture was held at from 120° C. to 230° C. for 15 hours with stirring. The resulting polyester polyol was removed from the reactor at 100° C.

The polyester polyol was tested according to the Acid Number, Hydroxyl Number, Heat of Fusion, Peak Melting Temperature, Peak Crystallization Temperature, and Heat of Crystallization test methods and found to have an acid number of 1.57, hydroxyl number of 65, a heat of fusion of 85.4 J/g, a peak melting temperature of 45.4° C., a heat of crystallization of 84.4 J/g, and a peak crystallization temperature of 41.1° C.

Example 3

Hydrogenated soybean oil (606.3 g (0.686 mol)) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring. The mixture was held at 215° C. for 5 hours while stirring continued.

Then 123.8 g (1.194 mol) of phthalic anhydride were added to the reactor along with 16.4 g of o-xylene as an azeotrope. Mixture was held at a temperature of from 120° C. to 230° C. for 15 hours while stirring continued.

Then, the resulting polyester polyol was taken out at 100° C. The polyester polyol was tested according to the Acid Number, Hydroxyl Number, Heat of Fusion, and Peak Melting Temperature, Peak Crystallization Temperature, and Heat of Crystallization of test methods and found to have an acid number of 0.57, hydroxyl number of 35.4, a heat of fusion of 73.5 J/g, a peak melting temperature of 41.8° C., a heat of crystallization of 76.7 J/g, and a peak crystallization temperature of 36.8° C.

Example 4

Hydrogenated soybean oil (606.3 g (0.686 mol)) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring at 215° C. for 5 hours.

Then 238.51 g (1.036 mol) of dodecanedioic acid and 16.4 g of o-xylene as an azeotrope. The mixture was held at from 120° C. to 230° C. for 15 hours while stirring continued. The resulting polyester polyol was taken out of the reactor at 100° C.

The polyester polyol was tested according to the Acid Number test method and found to have an acid number of 0.80.

Example 5

Hydrogenated soybean oil (606.3 g (0.686 mol)) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring. The mixture was held at 215° C. for 5 hours while stirring continued.

Then 122.58 g (1.038 mol) of succinic acid and 16.4 g of o-xylene as an azeotrope. Mixture was stirred from 120° C. to 230° C. for 15 hours. The resulting polyester polyol was removed from the reactor at 100° C.

The polyester polyol was tested according to the Acid Number test method and found to have an acid number of 0.77.

Example 6

Hydrogenated soybean oil (545.25 g, (0.617 mol)) having an Iodine Value of 0.5 and 154.58 g (0.617 mol) of bis (trimethylolpropane) were charged to a 2 L glass reactor equipped with a distillation apparatus and the atmosphere in the reactor was replaced with nitrogen. The temperature was set to 215° C. and stirring was started. When the mixture was molten, 4.19 g of FASCAT 4102 monobutyltin tris-2-ethylhexanoate catalyst (PMC Organometalix Inc., Mount Laurel, N.J.) was added thereto with stirring. The mixture was held at 215° C. while stirring continued for 5 hours.

Then 151.4 g (1.036 mol) of adipic acid and 16.4 g of o-xylene as an azeotrope. The mixture was stirred from 120° C. to 230° C. for 15 hours. The resulting polyester polyol was removed from the reactor at 100° C.

The polyester polyol was tested according to the Acid Number, Heat of Fusion, Peak Melting Temperature, Peak Crystallization Temperature, and Heat of Crystallization test methods and found to have an acid number of 0.28, a heat of fusion of 82.6 J/g, a peak melting temperature of 35.5° C., a heat of crystallization of 84.7 J/g, and a peak crystallization temperature of 33.8° C.

Example 7

Hydrogenated soybean oil (611.74 g (0.693 mol)) having an Iodine Value of 0.5 and 88.08 g (0.346 mol) of di-pentaerythritol were charged to a 2 L glass reactor equipped with a distillation apparatus and the atmosphere in the reactor was replaced with nitrogen. The temperature was set to 215° C. and stirring was started. When the mixture was molten, 3.28 g of FASCAT 4102 catalyst was added thereto with stirring. The mixture was held at 215° C. with continuous stirring for 5 hours.

Then 105.28 g (0.892 mol) of succinic acid and 16.4 g of o-xylene as an azeotrope. The mixture was stirred for from 120° C. to 230° C. for 15 hours. Then, the resulting polyester polyol was taken out at 100° C.

The polyester polyol was tested according to the Acid Number, Heat of Fusion, Peak Melting Temperature, Peak Crystallization Temperature, and Heat of Crystallization test methods and found to have an acid number of 1.3, a heat of fusion of 92.0 J/g, a peak melting temperature of 45.7° C., a heat of crystallization of 89.3 J/g, and a peak crystallization temperature of 39.6° C.

Example 8

NATUREWAX S-155 hydrogenated soybean oil, in an amount of 837.1 g, having an Iodine Value of 0.48 (Cargill Inc., Charlotte, N.C.) was melted in a glass reactor by heating to 105° C. Pentaerythritol, in an amount of 129.1 g, and 97 mg of lithium hydroxide monohydrate were then added to the reactor with stirring. The mixture was heated to 220° C. and under a nitrogen atmosphere. The mixture was held at 220° C. for 2 hours and then cooled to 93° C., at which point the stirring was discontinued. The mixture was allowed to solidify and cool to room temperature overnight. The mixture was then heated to 130° C., at which point stirring was started. Adipic acid, in an amount of 185.4 g, and 58 mg, tetra-n-butyl titanate were then added to the mixture. The mixture was heated in stages under a nitrogen atmosphere to 220° C., held at 220° C. for 7 hours, and then cooled to 117° C. and discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 56.4, an acid number of 0.60, a heat of fusion of 95.3 J/g, a peak melting temperature of 43.4° C., a peak crystallization temperature of 40.1° C., and a heat of crystallization of 97.7 J/g.

Example 9

NATUREWAX S-155 hydrogenated soybean oil, in an amount of 779.7 g, having an Iodine Value of 0.48 (Cargill Inc., Charlotte, North Carolina) was melted in a glass reactor by heating to 120° C. Pentaerythritol, in an amount of 120.2 g, and 1.10 g of FASCAT 4102 monobutyltin tris-2-ethylhexanoate (PMC Organometalix Inc., Mount Laurel, New Jersey) were then added to the reactor with stirring. The mixture was heated to 210° C. and under a nitrogen atmosphere. The mixture was held at 210° C. for 3 hours and then cooled to 99° C., at which point the stirring was discontinued. The mixture was allowed to solidify and cool to room temperature overnight. The mixture was then heated to 122° C., at which point stirring was started. Adipic acid, in an amount of 217.4 g was then added to the mixture. The mixture was heated in stages under a nitrogen atmosphere to 210° C., held at 230° C. for 3 hours and then heated to, and held at, 240° C. for 1.5 hours. The mixture was cooled to 130° C. and then discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 28.3, an acid number of 0.49, a heat of fusion of 88.3 J/g, a peak melting temperature of 41.7° C., a peak crystallization temperature of 38.3° C., and a heat of crystallization of 86.4 J/g.

Other embodiments are within the claims.

A semi-crystalline polyester polyol that has an acid number less than 4 and includes the reaction product of a saturated fatty component that has a hydroxyl number less than two (or even less than one), a polyhydric alcohol that has at least three hydroxyl groups, and a dibasic acid, the semi-crystalline polyester polyol exhibiting a heat of fusion of at least 25 J/g. The semi-crystalline polyester polyol is solid at room temperature.

A semi-crystalline polyester polyol that has an acid number less than 4 and includes the reaction product of a saturated fatty component that has a hydroxyl number less than two (or even less than one), a polyhydric alcohol that has at least three hydroxyl groups, and a dibasic acid. The semi-crystalline polyester polyol is solid at room temperature.

What is claimed is:

1. A semi-crystalline polyester polyol comprising:
the reaction product of
a saturated fatty component having a hydroxyl number less than 2, the saturated fatty component being selected from the group consisting of saturated fatty acid, saturated fatty acid ester, saturated oil, and combinations thereof,
a polyhydric alcohol comprising at least three hydroxyl groups, and
a dibasic acid,
the semi-crystalline polyester polyol being solid at room temperature, and having an acid number of less than 4 and a hydroxyl number of from 10 to 110.

2. The semi-crystalline polyester polyol of claim 1, wherein the semi-crystalline polyester polyol has an average hydroxyl functionality of from to 1.5 to 2.5.

3. The semi-crystalline polyester polyol of claim 1, wherein the semi-crystalline polyester polyol exhibits a heat of fusion of at least 25 Joules per gram.

4. The semi-crystalline polyester polyol of claim 1, wherein the semi-crystalline polyester polyol exhibits a heat of fusion of at least 50 Joules per gram.

5. The semi-crystalline polyester polyol of claim 1, wherein the semi-crystalline polyester polyol exhibits a peak melt temperature of at least 30° C.

6. The semi-crystalline polyester polyol of claim 1, wherein the semi-crystalline polyester polyol exhibits a peak crystallization temperature of at least 30° C.

7. The semi-crystalline polyester polyol of claim 1, wherein the semi-crystalline polyester polyol exhibits a peak crystallization temperature of at least 35° C.

8. The semi-crystalline polyester polyol of claim 1, wherein the semi-crystalline polyester polyol has a hydroxyl number of from 20 to 45.

9. The semi-crystalline polyester polyol of claim 1, wherein the semi-crystalline polyester polyol has an acid number of no greater than 2.

10. The semi-crystalline polyester polyol of claim 1, wherein the dibasic acid is selected from the group consisting of succinic acid, adipic acid, suberic acid, sebacic acid, dodecanedioic acid, terephthalic acid, phthalic acid, phthalic anhydride, and combinations thereof.

11. The semi-crystalline polyester polyol of claim 1, wherein the polyhydric alcohol is a tetraol.

12. The semi-crystalline polyester polyol of claim 1, wherein the fatty component has an Iodine Value no greater than 50.

13. The semi-crystalline polyester polyol of claim 1, wherein the semi-crystalline polyester polyol is further derived from monomeric diol.

14. The semi-crystalline polyester polyol of claim 1, wherein the semi-crystalline polyester polyol has a hydroxyl number of from 10 to 110 and an acid number no greater than 2.

15. The semi-crystalline polyester polyol of claim 1, wherein the semi-crystalline polyester polyol has a hydroxyl number of from 10 to 110 and an acid number no greater than 2, and exhibits a heat of fusion of at least 50 Joules per gram.

16. The semi-crystalline polyester polyol of claim 1, wherein the semi-crystalline polyester polyol has a hydroxyl number of from 20 to 45 and an acid number less than 1, and exhibits a heat of fusion of at least 50 Joules per gram.

17. A semi-crystalline polyester polyol comprising:
a second reaction product of a dibasic acid and a first reaction product, the first reaction product being derived from
a saturated fatty component that has a hydroxyl number less than 2, the saturated fatty component being selected from the group consisting of saturated fatty acid, saturated fatty acid ester, saturated oil, and combinations thereof, and
polyhydric alcohol comprising at least three hydroxyl groups,
the semi-crystalline polyester polyol being solid at room temperature and having an acid number of less than 4.

18. The semi-crystalline polyester polyol of claim 17, wherein the saturated fatty component is a saturated fatty acid ester, a saturated oil, or a combination thereof, and the first reaction product is a transesterification product resulting from the transesterification of the saturated fatty component with the polyhydric alcohol.

19. The semi-crystalline polyester polyol of claim 17, wherein the semi-crystalline polyester polyol has a hydroxyl number of from 10 to 110.

20. The semi-crystalline polyester polyol of claim 17, wherein the semi-crystalline polyester polyol has a hydroxyl number of from 20 to 45.

21. The semi-crystalline polyester polyol of claim 17, wherein the semi-crystalline polyester polyol exhibits a heat of fusion of at least 25 Joules per gram.

22. A method of making a semi-crystalline polyester polyol, the method comprising:
reacting a saturated fatty component that has a hydroxyl number less than 2, the saturated fatty component being selected from the group consisting of saturated fatty acid, saturated fatty acid ester, saturated oil, and combinations thereof, and a polyhydric alcohol that includes at least three hydroxyl groups to form a first reaction product; and
reacting the first reaction product with a dibasic acid to form a solid semi-crystalline polyester polyol having an acid number of less than 4.

23. The method of claim 22, wherein the saturated fatty component comprises an ester and the method comprises transesterifying the ester with the polyhydric alcohol.

* * * * *